(12) United States Patent
Schieferstein et al.

(10) Patent No.: US 7,214,730 B2
(45) Date of Patent: May 8, 2007

(54) DISPERSANT COMPOSITIONS CONTAINING GLYCEROL CARBONATE AND POLYESTER-BASED DISPERSANTS

(75) Inventors: Ludwig Schieferstein, Ratingen (DE); Manfred Gorzinski, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 45 days.

(21) Appl. No.: 10/492,040

(22) PCT Filed: Sep. 27, 2002

(86) PCT No.: PCT/EP02/10858

§ 371 (c)(1),
(2), (4) Date: Apr. 6, 2004

(87) PCT Pub. No.: WO03/031525

PCT Pub. Date: Apr. 17, 2003

(65) Prior Publication Data

US 2005/0004289 A1    Jan. 6, 2005

(30) Foreign Application Priority Data

Oct. 6, 2001  (DE) ............... 101 49 379

(51) Int. Cl.
*C08K 5/00*  (2006.01)
(52) U.S. Cl. .............. 524/108; 524/111; 524/280
(58) Field of Classification Search ........... 524/108, 524/111, 280
See application file for complete search history.

(56) References Cited

FOREIGN PATENT DOCUMENTS

WO    WO 87/07735 A1    12/1987

*Primary Examiner*—Edward J. Cain
(74) *Attorney, Agent, or Firm*—John F. Daniels; Jane E. Alexander

(57) ABSTRACT

Dispersant compositions are described which contain: (a) a carrier medium comprising glycerol carbonate, the carrier medium present in an amount of from 10 to 80% by weight based on the composition; and (b) one or more polyester dispersants present in an amount of from 20 to 90% by weight based on the composition.

19 Claims, No Drawings

DISPERSANT COMPOSITIONS CONTAINING GLYCEROL CARBONATE AND POLYESTER-BASED DISPERSANTS

BACKGROUND OF THE INVENTION

Dispersants are used in paint manufacture largely for the following reasons:
a) to disperse the film former,
b) to disperse pigments and fillers and
c) to disperse other additives which may be present in paint formulations, for example hardening accelerators, thickeners, flow controllers, flatting agents, preservatives.

As the expert is aware, paint manufacturers generally seek to have the components used for the production of paint formulations available in a form which allows for easy handling. A major advantage in this regard is if a component is present in liquid rather than solid form and can be poured at room temperature (room temperature in the context of the present invention is understood to be a temperature of 25° C. This is routinely achieved by the use of solvents. In principle, suitable solvents are on the one hand water and, on the other hand, organic solvents. However, there are instances where, on the one hand, water is not suitable because it is unable satisfactorily to dissolve the dispersant or because the dispersant is not permanently stable in water and where, on the other hand, organic solvents are not suitable. The latter point is of increasing importance because organic solvents have become increasingly unattractive for environmental reasons so that substantial freedom from VOCs (volatile organic compounds) is desirable. Accordingly, there is a constant demand for dispersants to be presented in a form which is not attended by any of the above-mentioned disadvantages.

BRIEF SUMMARY OF THE INVENTION

The present invention relates, in general, to dispersant compositions for paint formulations, these dispersant compositions being liquid and pourable at 25° C. and being based on a special carrier medium and a polyester-based dispersant.

The problem addressed by the present invention was to provide dispersant compositions which would consist of a carrier medium and one or more dispersants and which would satisfy the following conditions: the compositions would be liquid at 25° C., homogeneous, concentrated, pourable, stable in storage and substantially free from VOCs.

By "homogeneous" is meant that the dispersant is homogeneously dispersed in the carrier medium. By "concentrated" is meant that the composition contains at least 20% by weight of the dispersant, based on the composition as a whole. "Pourable" means that the Brookfield viscosity of the composition, as measured at 25° C./25 r.p.m., is below 50,000 mPas. "Stable in storage" is understood to mean that, even in the event of prolonged storage, the composition remains stable both chemically (no decomposition of the components) and in regard to consistency (no loss of homogeneity). "Substantially free from VOCs" is understood to mean that the composition contains hardly any volatile substances. This means in particular that the carrier medium of the composition is of low volatility.

In addition, the composition of the carrier medium should be such that no adverse interactions occur when the combination of carrier medium and dispersant is used for the production of a paint formulation where it inevitably comes into contact with film formers, pigments, fillers and/or paint additives.

The present invention relates to dispersant compositions for paint formulations which are liquid and pourable at 25° C. and which consist of
a) 10 to 80% by weight of a carrier medium in the form of glycerol carbonate and
b) 20 to 90% by weight of one or more polyester-based dispersants for paint formulations.

DETAILED DESCRIPTION OF THE INVENTION

It has surprisingly been found that the compositions according to the invention solve the problem stated above excellently in every respect. The compositions are liquid, homogeneous, pourable and stable in storage. They are also distinguished by substantial freedom from VOCs.

The VOC content of a composition can be determined by methods known to the relevant expert. In the context of the present invention, substantial freedom from VOCs is understood to mean a VOC value of less than 0.5% and preferably less than 0.2%, based on the composition as a whole. In the context of the present invention, the VOC content of a sample is determined in accordance with DIN 75201 ("Determination of the Fogging Behavior of Materials Used for the Interior Trim of Motor Vehicles") using the following procedure: the sample is placed on the bottom of a lip-free glass beaker with fixed graduations. The beaker is covered with an aluminium foil on which volatile constituents from the test specimen or the sample are able to condense. The aluminium foil is cooled. The beaker thus prepared is placed for 16 hours in a bath thermostat set to a test temperature of 100±0.3° C. The effect of the fogging deposit on the aluminium foil is quantitatively determined by weighing the foil before and after the fogging test. The VOC value is calculated in accordance with the following equation:

$$VOC \text{ value } (\%) = (A/B) * 100$$

where
A is the weight of the fogging deposit (in g) and
B is the weight of the sample used (in g).

In addition, the compositions according to the invention are compatible with film formers, pigments, fillers and paint additives which are normally used in the production of paint formulations.

The carrier medium a) is glycerol carbonate of which the rational name is 4-hydroxymethyl-1,3-dioxolan-2-one. The compound carries the Chemical Abstracts Registry Number (CAS Registry Number) 931-40-8 and is characterized by formula (I) below:

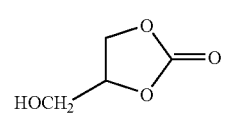

(I)

The dispersant b) is a polyester. Particularly preferred polyesters are carboxyl-containing polyesters of which at least 5% by weight is water-soluble in the neutralized or partly neutralized state and of which at least 20% by weight is soluble in glycerol carbonate in the acidic state.

The dispersants suitable for the purposes of the invention may be used individually or in admixture with one another.

Suitable polyesters are in particular those which, besides hydrophobic chains and carboxyl groups, also contain ethylene oxide oligomers as structural elements.

The present invention also relates to the use of the above-described dispersant compositions in the production of paint formulations.

EXAMPLES

Substances Used

Hydropalat 3275: pigment dispersant for water-based paint systems (37.5% aqueous solution of a polyester neutralized with dimethyl ethanolamine; a product of Cognis Deutschland GmbH).

DISPERSANT COMPOSITIONS

Example 1

100 g Hydropalat 3275 were freed from water and diethanolamine in a rotary evaporator at 80° C./20 mbar. 38 g of a viscous wax solid at room temperature were obtained. The wax was melted with the same quantity of glycerol carbonate in a water bath at 70° C. and homogenized by stirring. A solution liquid at room temperature with a Brookfield viscosity of 19 Pas (as measured at 20 r.p.m., 25° C., spindle 5) was obtained. The mixture was stored for three months at room temperature and was found to be stable in storage.

What is claimed is:

1. A dispersant composition consisting of:
   (a) a carrier medium consisting of glycerol carbonate, the carrier medium present in an amount of from 10 to 80% by weight based on the composition; and
   (b) one or more polyester dispersants present in an amount of from 20 to 90% by weight based on the composition.

2. A dispersant composition comprising:
   (a) a carrier medium comprising glycerol carbonate, the carrier medium present in an amount of from 10 to 80% by weight based on the composition; and
   (b) one or more polyester dispersants present in an amount of from 20 to 90% by weight based on the composition, wherein the one or more polyester dispersants comprises a carboxyl-containing polyester, wherein at least 5% by weight of the carboxyl-containing polyester is water-soluble in the neutralized state, and wherein at least 20% by weight of the carboxyl-containing polyester is soluble in glycerol carbonate in the acidic state.

3. A dispersant composition comprising:
   (a) a carrier medium comprising glycerol carbonate, the carrier medium present in an amount of from 10 to 80% by weight based on the composition; and
   (b) one or more polyester dispersants present in an amount of from 20 to 90% by weight based on the composition, wherein the one or more polyester dispersants comprises a polyester having ethylene oxide oligomer structural elements.

4. The dispersant composition according to claim 2, wherein the carboxyl-containing polyester further comprises ethylene oxide oligomer structural elements.

5. The dispersant composition according to claim 1, wherein the composition is substantially free from volatile organic compounds.

6. The dispersant composition according to claim 2, wherein the composition is substantially free from volatile organic compounds.

7. The dispersant composition according to claim 3, wherein the composition is substantially free from volatile organic compounds.

8. The dispersant composition according to claim 4, wherein the composition is substantially free from volatile organic compounds.

9. The dispersant composition according to claim 1, wherein the composition is liquid and pourable at 25° C.

10. The dispersant composition according to claim 2, wherein the composition is liquid and pourable at 25° C.

11. The dispersant composition according to claim 3, wherein the composition is liquid and pourable at 25° C.

12. The dispersant composition according to claim 4, wherein the composition is liquid and pourable at 25° C.

13. The dispersant composition according to claim 5, wherein the composition is liquid and pourable at 25° C.

14. The dispersant composition according to claim 8, wherein the composition is liquid and pourable at 25° C.

15. A dispersant composition comprising:
   (a) a carrier medium comprising glycerol carbonate, the carrier medium present in an amount of from 10 to 80% by weight based on the composition; and
   (b) one or more polyester dispersants present in an amount of from 20 to 90% by weight based on the composition, wherein the one or more polyester dispersants comprises a carboxyl-containing polyester, wherein at least 5% by weight of the carboxyl-containing polyester is water-soluble in the neutralized state, and wherein at least 20% by weight of the carboxyl-containing polyester is soluble in glycerol carbonate in the acidic state;
   wherein the composition is liquid and pourable at 25° C. and wherein the composition is substantially free from volatile organic compounds.

16. The dispersant composition according to claim 15, wherein the one or more polyester dispersants comprises a polyester having ethylene oxide oligomer structural elements.

17. The dispersant composition according to claim 15, wherein the carboxyl-containing polyester further comprises ethylene oxide oligomer structural elements.

18. A paint formulation comprising a dispersant composition comprising:
   (a) a carrier medium comprising glycerol carbonate, the carrier medium present in an amount of from 10 to 80% by weight based on the composition: and (b) one or more polyester dispersants present in an amount of from 20 to 90% by weight based on the composition.

19. A paint formulation comprising a dispersant composition according to claim 15.

* * * * *